United States Patent
Jungerhans

(10) Patent No.: US 6,620,399 B1
(45) Date of Patent: Sep. 16, 2003

(54) PURIFICATION OF GASES, IN SYNTHESIS GAS PRODUCTION PROCESS

(76) Inventor: Robert Rudolf Josef Jungerhans, 746 S. Madison Ave., Pasadena, CA (US) 91106

( * ) Notice: Subject to any disclaimer, the term of this patent is extended or adjusted under 35 U.S.C. 154(b) by 0 days.

(21) Appl. No.: 10/217,976

(22) Filed: Aug. 14, 2002

Related U.S. Application Data

(63) Continuation-in-part of application No. 09/546,667, filed on Apr. 10, 2000, now abandoned.

(51) Int. Cl.⁷ .............................. C01C 1/04; F25J 3/00; F25J 3/08
(52) U.S. Cl. .......................... 423/359; 62/617; 62/620; 62/932; 62/934
(58) Field of Search .................... 62/620, 630, 617, 62/932, 934; 252/374, 375, 376; 423/359

(56) References Cited

U.S. PATENT DOCUMENTS

| | | |
|---|---|---|
| 3,442,613 A | 5/1969 | Grotz, Jr. |
| 4,296,085 A | 10/1981 | Banquy |
| 4,312,851 A | 1/1982 | Isalski et al. |
| 4,409,196 A | 10/1983 | Skinner et al. |
| 4,524,056 A | 6/1985 | Banquy |
| 4,544,390 A | 10/1985 | Traficante |
| 4,588,427 A | 5/1986 | Yao et al. |
| 4,689,208 A * | 8/1987 | Pinto ............................ 423/362 |
| 4,725,380 A | 2/1988 | Pinto |
| 4,780,298 A | 10/1988 | Kowai |
| 4,822,521 A | 4/1989 | Fuderer |
| 5,736,116 A | 4/1998 | LeBlanc et al. |
| 5,935,544 A | 8/1999 | Bhakta |

FOREIGN PATENT DOCUMENTS

| | | |
|---|---|---|
| GB | 2186870 A | 8/1987 |
| WO | WO 92/12927 | 8/1992 |

* cited by examiner

Primary Examiner—Wayne A. Langel
Assistant Examiner—Jonas N. Strickland
(74) Attorney, Agent, or Firm—William W. Haefliger

(57) ABSTRACT

A purifier process, includes supplying a first stream of a feed gas containing hydrogen and nitrogen in a MOL ratio of about 2/1, and also containing methane, and argon, then cryogenically separating the feed gas into the following:

a) a second stream of a synthesis gas containing hydrogen and nitrogen in a MOL ratio of about 3/1, b) waste gas containing principally nitrogen, and also containing substantially all of the methane supplied in the first stream, and splitting the waste gas into:

c) a third stream of nitrogen rich gas d) a fourth stream of methane rich gas useful as a fuel, or as a feed to a subsequent process.

11 Claims, 4 Drawing Sheets

PURIFICATION OF GASES, IN SYNTHESIS GAS PRODUCTION PROCESS

BACKGROUND OF THE INVENTION

This application is a continuation-in-part of Ser. No. 09/546,667, now abandoned, filed Apr. 10, 2000.

The invention relates generally to purification of feed gas used for the manufacture of ammonia, and more particularly to improvements in processing of feed gas from which hydrogen rich ammonia synthesis gas, and waste gas, are derived. The invention particularly concerns treatment of the waste gas to derive useful gas streams, one of which is nitrogen rich, and another is methane rich.

In prior purification processes, waste gas is separated from the synthesis gas, and it contains excess nitrogen from the feed gas, a small amount of hydrogen, all of the incoming methane, and about 60% of the incoming Argon. Such waste gas is typically utilized as fuel in a primary reformer. Improvements in treatment of the waste gas are needed, for enhanced overall process efficiency.

SUMMARY OF THE INVENTION

It is a major object of the invention to provide improvements in treatment of such waste gas, as will be seen. Basically, the improved process of the invention derives two product streams from the waste gas, one of which is nitrogen rich, and the other of which is methane rich, with a higher heating value than in processes employed so far, more suitable for use as a fuel, with less nitrogen going up the stack and eventually full recovery of hydrogen. The overall process includes the steps:

1) supplying a first stream of a feed gas containing hydrogen and nitrogen in a MOL ratio of about 2/1, and also containing methane and argon,
2) cryogenically separating the feed into the following:
   a) a second stream of a synthesis gas containing hydrogen and nitrogen in a MOL ratio of about 3/1,
   b) waste gas containing principally nitrogen, and also containing substantially all of the methane supplied in the first stream,
3) and splitting the waste gas into:
   c) a third stream of nitrogen rich gas
   d) a fourth stream of methane rich gas, useful as a fuel or as a feed to a subsequent process.

In that overall process, the second, third and fourth streams are typically delivered as product streams; and the second product stream of synthesis gas may be delivered to an ammonia synthesis process. Also, the nitrogen rich third stream may be recycled to the process air compressor.

Another object is to provide a nitrogen-methane separator for reception of waste gas derived from the initial separator in which synthesis gas was stripped from such waste gas. In this regard, the waste gas to be delivered to the nitrogen methane separator is typically passed through a cryogenic cold box for further cooling.

A further object is to pass the above described second, third and fourth streams through the cold box, for further cooling. Refrigeration for the cold box maybe produced by operation of an expander turbine.

Yet another object is to provide refrigeration by expansion of the waste gas over a Joule Thompson valve, prior to passage of the waste gas through a heat exchanger in which cooling of synthesis gas is effected, the waste gas then passing to the cold box.

An additional object is to re-compress the waste gas prior to the splitting step. Such re-compressed waste gas is then typically passed through the cold box, and the second, third and fourth streams are also passed through the cold box.

These and other objects and advantages of the invention, as well as the details of an illustrative embodiment, will be more fully understood from the following specification and drawings, in which:

DRAWING DESCRIPTION

DETAILED DESCRIPTION

Figure 1:
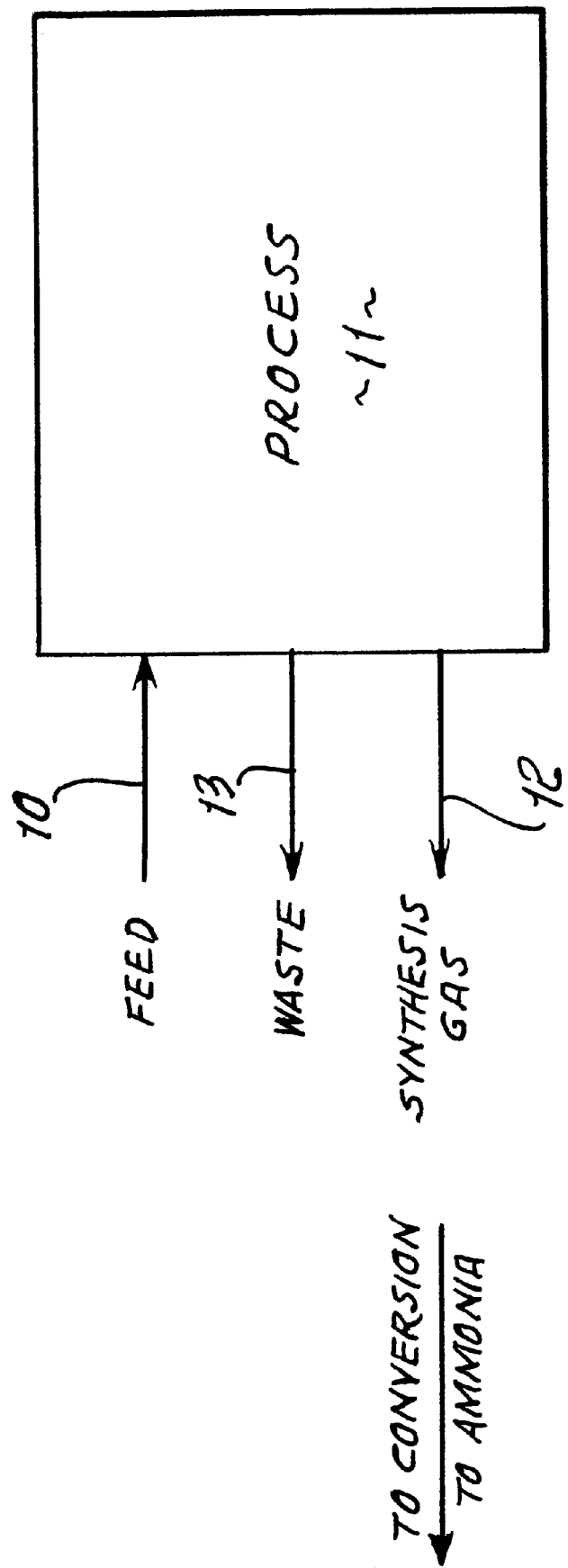
FIG. 1 is a diagram showing conversion of feed gas to waste gas and synthesis gas, as in a known process.

In FIG. 1, feed gas, such as hydrogen, nitrogen, argon and methane is fed at 10 to a purification or separation process 11. The feed gas typically has an H/N ratio of about 2. Separated hydrogen is fed at 12 (in a stream with a H/N ratio of. about 3) from the process 11, and delivered for example as synthesis gas to a conversion process producing ammonia. Separated "waste" gas is fed at 13 from the process 11, and contains nitrogen, methane, and about 60% of the incoming argon at 10, usable as a low grade fuel for combustion and heating, for example to the fired reformer or to a boiler. The typical heating value of the waste gas 13 is approximately 160 $BTU/_{SCF}$ (LHV). See in this regard U.S. Pat. No. 3,442,613 to Grotz.

Figure 2:
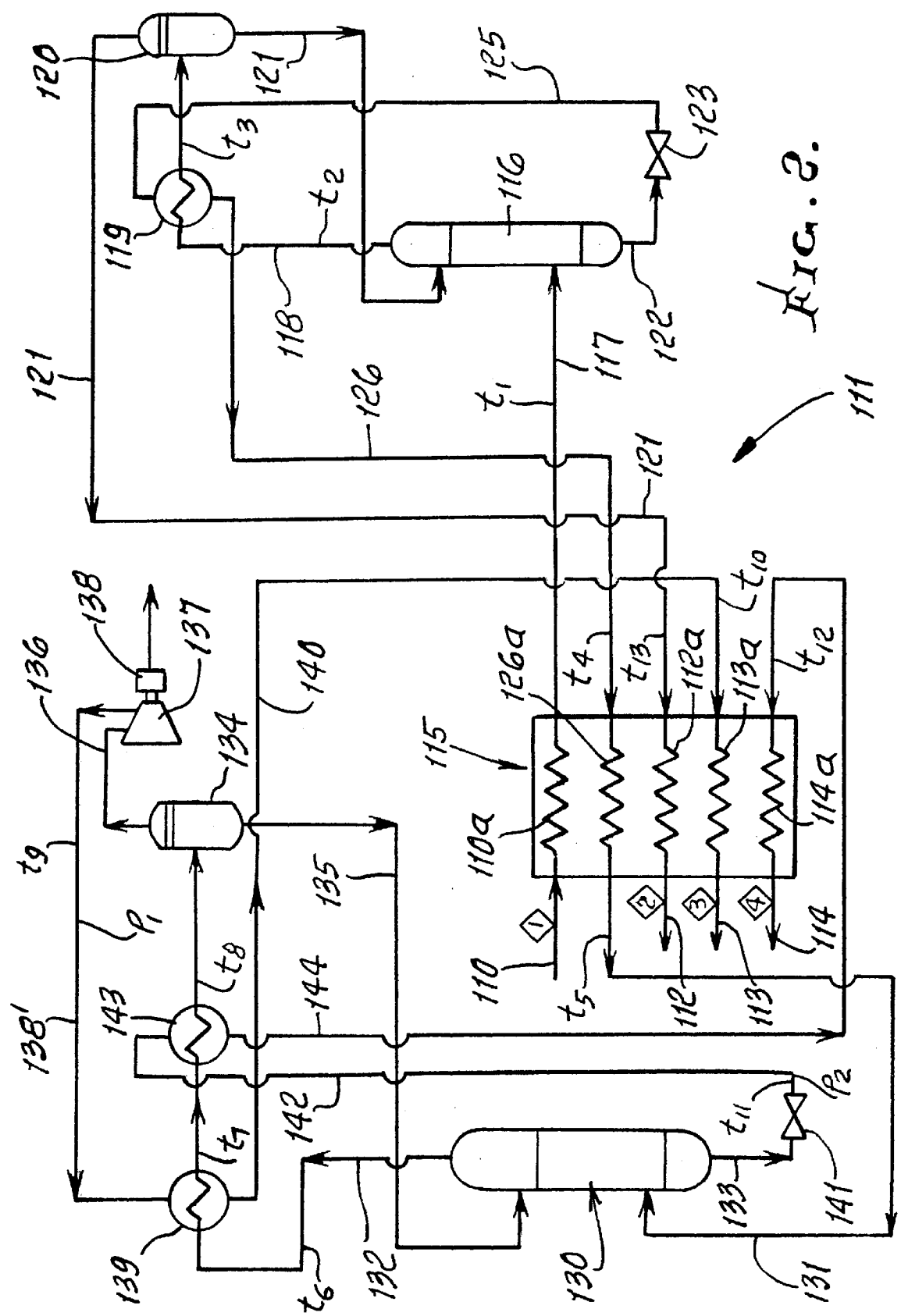
FIG. 2 is a process diagram showing splitting of waste gas into nitrogen rich, and methane rich streams.
Figure 2A:
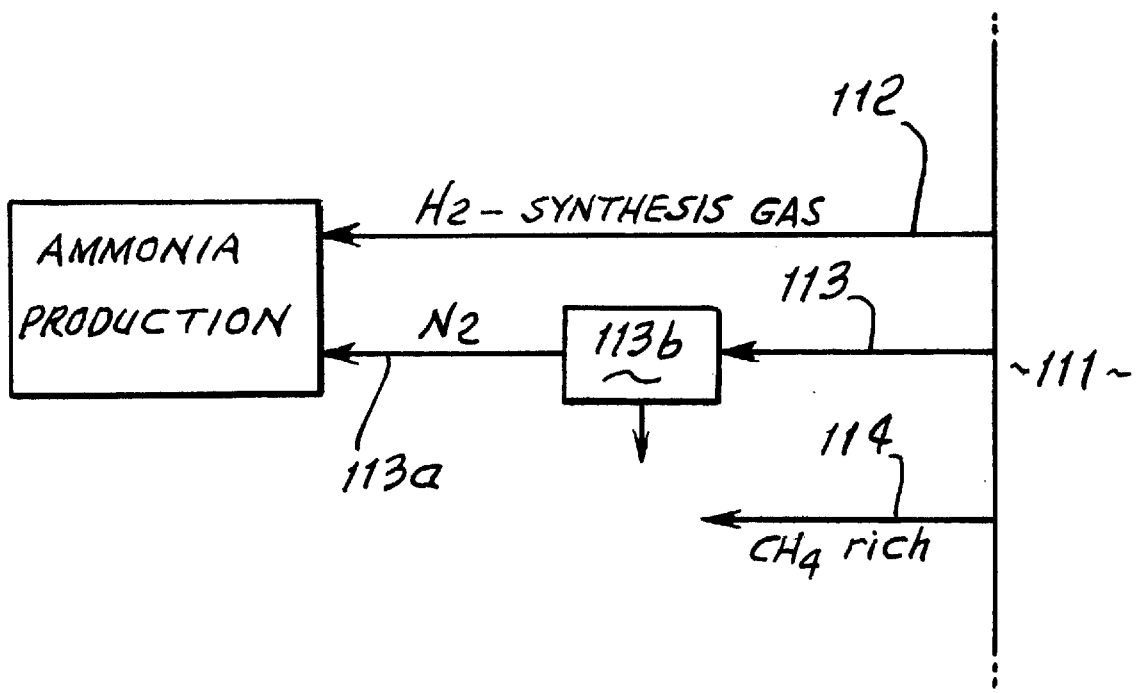
FIG. 2a is a process diagram.

In a preferred and improved purification process, as represented in FIG. 2, feed gas is delivered at 110 to a purification or separation process indicated generally at 111. Synthesis gas is withdrawn from the process at 112. Nitrogen-rich gas and methane-rich gas are separated in the process, and delivered as gas streams at 113 and 114, respectively. FIG. 2a shows use of the stream 113 as a nitrogen feed 113a to the ammonia conversion process, to which stream 112 is also fed. Stream 113 may be further processed at 113b. The methane rich stream 114 can be used as a high-grade fuel, as for combustion heating purposes.

Referring in detail to process 111 in FIG. 2, it includes a "cold-box" or refrigerating heat exchanger 115 through which the streams 110, 112, 113 and 114 are fed for heat exchange, as via coils or ducts 110a, 112a 113a and 114a, as shown.

A separation column 116 (which may be of evaporation type) receives the refrigerated feed via line 117, and synthesis gas is taken off the top of the column and passed via line 118 through a heat exchanger 119 and to a reflux column 120. Synthesis gas is taken from the top of 120 and passed via line 121 to the duct 112a for delivery at 112. Reflux is taken from the bottom of column 120 and passed via line 121 to the top of column 116, for reflux purposes.

Waste gas is taken from the bottom of the column 116, and passed via line 122 to and over the Joule Thompson valve 123 to produce refrigeration to heat exchanger 119. A representative drop through the valve 123 is about 300 psi.

Cooled waste gas from line 122 then passes via line 125 through heat exchanger 119, to cool synthesis gas passing to column 120. The waste gas (containing $N_2$ and $CH_4$) then passes via line 126 through duct or coil 126a in the cold box.

A second column 130.is added to the process, and the waste gas after passing through duct 126a in the cold box is delivered via line 131 to column 130. In the latter, the waste gas is separated into nitrogen-rich gas leaving the top of the column via line 132, and methane-rich gas leaving the bottom of the column, via line 133. The nitrogen rich gas stream passes successively through the heat exchangers 139 and 143 to drop its temperature, and then into the reflux column 134. Impurities leave the bottom of column 134, for reflux and return via line 135 to column 130. Purified nitrogen-rich gas leaves the top of column 134, passing via line 136 to and through expander turbine 137. The turbine is thereby driven to produce electrical energy, as via generator 138, and to produce additional refrigeration (by gas expansion) usable for example to refrigerate cold box 115. A representative pressure drop through the expander turbine is about 30 psi. Purified nitrogen gas further cooled at 137, passes at 138 through heat exchanger 139, and at 140 to coil or duct 113a in the cold box 115. Nitrogen then passes to delivery duct 113, as discussed in FIG. 2a.

The methane rich gas stream at 133 passes through a Joule Thompson valve 141 to drop its pressure and to further cool the stream. The cooled stream then passes at 142 through heat exchanger 143, and then at 144 to coil or duct 114a in the cold box 115. The methane stream is then delivered at 114, as discussed in FIG. 2a.

Accordingly, overall process efficiency is improved, and two usable gas streams at 113 and 114 are produced, in addition to the production of synthesis gas, at 112. For the described process configuration, the heating value of the methane rich gas stream delivered at 114 is typically about 625 BTU/SCF (LHV).

Representative gas temperatures and pressures, at the points indicated, are:

$t_1 \cong -284°$ F.
$t_2 \cong -287°$ F.
$t_3 \cong -291°$ F.
$t_4 \cong -288°$ F.
$t_5 \cong -271°$ F.
$t_6 \cong -277°$ F.
$t_7 \cong -284°$ F.
$t_8 \cong -286°$ F.
$t_9 \cong -313°$ F.
$t_{10} \cong -286°$ F.
$t_{11} \cong -296°$ F.
$t_{12} \cong -286°$ F.
$t_{13} \cong -291°$ F.
$P_1 \cong 5$ psig
$P_2 \cong 5$ psig Other values of a representative FIG. 2 process are given below, $H_2$, $N_2$, A and $CH_4$ values being in MOL per HR.

|  | feed 1 | SG 2 | $N_2$-rich 3 | Methane-rich 4 |
|---|---|---|---|---|
| ° F. | 40 | 34.2 | 34.2 | 34.2 |
| psig | 434 | 415.0 | 5.0 | 5.0 |
| $H_2$ | 11689.5 | 11501.2 | 188.5 | 0.2 |
| $N_2$ | 5767.5 | 3827.3 | 1792.7 | 150.0 |
| A | 102.4 | 48.7 | 43.4 | 10.4 |
| $CH_4$ | 413.4 | 8.5 | 57.0 | 347.8 |
|  | 17972.8 | 15385.8 | 2081.6 | 508.4 |
|  | H/N = 2.03 | H/N = 3.00 |  | LHV = 625 $BTU_{SCF}$ (LHV) |

Figure 3:
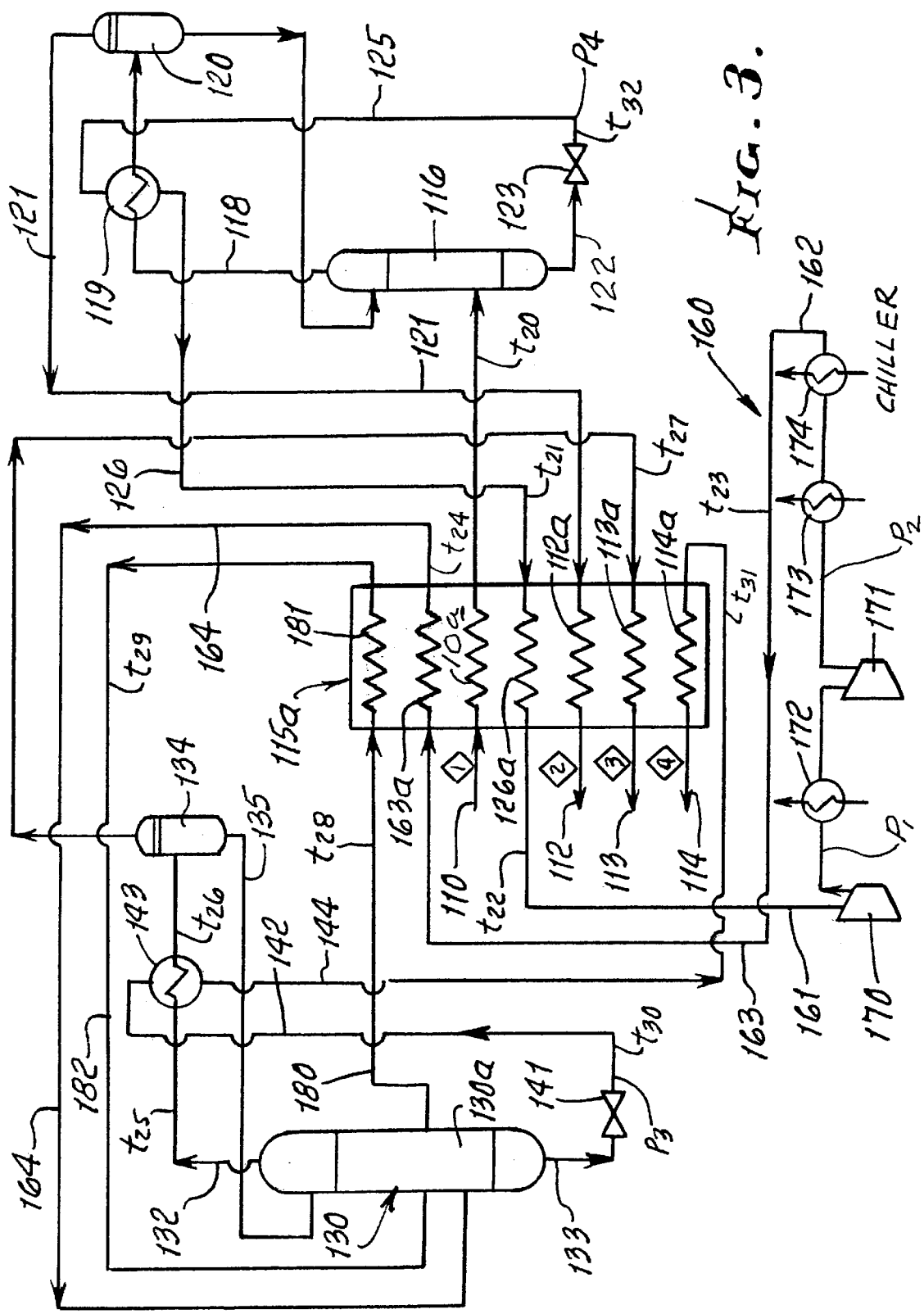
FIG. 3 is a process diagram like FIG. 2, but also showing a re-compression stage added for enhanced efficiency.

Referring now to FIG. 3, elements of the process the same as those in FIG. 2 bear the same identification numerals. The expander at 137 is eliminated, and a gas compressor stage indicated at 160 is added. It receives input at 161 from waste gas stream delivered via coil 126a in the cold box, as discussed above. The cold box-heat exchanger core is as shown. The compressed gaseous output at 162, from compression stage 160, is delivered via line 163, cold box coil 163a, and line 164 to the middle of separation column 130, as described above. The heating valve of the methane rich gas stream at 114 is typically about 480 BTU/$_{SCF}$ (LHV).

Additional elements of the compression stage include: gas compressing stages 170 and 171; heat exchangers 172 and 173 positioned as shown; and gas chiller 174.

See also stream 170 exiting the column 130; passing through the coil 171 in the cold box 115a and then returning at 172 to the middle zone 130a of the column 130.

Representative gas temperature and pressure, at the points indicated, are listed as follows:

$t_{20} \cong -282°$ F.
$t_{21} \cong -289°$ F.
$t_{22} \cong +30°$ F.
$t_{23} \cong +45°$ F.
$t_{24} \cong -238°$ F.
$t_{25} \cong -263°$ F.
$t_{27} \cong -265°$ F.
$t_{28} \cong -249°$ F.
$t_{29} \cong -276°$ F.
$t_{30} \cong -296°$ F.
$t_{31} \cong -261°$ F.
$t_{32} \cong -303°$ F.
$P_1 \cong 105$ psig
$P_2 \cong 200$ psig
$P_3 \cong 8$ psig
$P_4 \cong 34$ psig Other values of a representative FIG. 3 process are given below, $H_2$, $N_2$, A and $CH_3$ values being in MOL per HR.

|  | Feed 1 | SG 2 | $N_2$-rich 3 | Methane-rich 4 |
|---|---|---|---|---|
| ° F. | 40° F. | 39.4 | 39.4 | 39.4 |
| psig | 434 | 365.0 | 180.0 | 5.0 |
| $H_2$ | 11689.5 | 11536.6 | 150.0 | 1.6 |
| $N_2$ | 5767.5 | 3899.30 | 1524.0 | 346.6 |
| A | 102.4 | 46.0 | 33.0 | 21.2 |
| $CH_4$ | 413.4 | 0.2 | 0.3 | 412.5 |
|  | 17972.8 | 15481.8 | 1707.3 | 781.9 |
|  | H/N = 2.03 | H/N = 2.96 |  | LHV = 482 $^{BTU}$/SCF (LHV) |

The presentation of the cold box in FIGS. 2 and 3 is schematic, and the cold box is characterized by the following:

1. Heat is exchanged between the flowing process streams, and the temperatures change accordingly as indicated. The heat exchange between the warm and the cold streams is in balance.
2. The heat exchanger or exchangers is (or are) embedded in one common unsectioned box, providing cold insulation to prevent ingression of heat to the exchanger. The insulation side of the cold box interior has one common identical stagnant temperature, for the whole box interior.
3. The presentation in FIGS. 2 and 3 indicates that heat exchange occurs directly between the warm and cold streams, inside the heat exchange device.

4. Accordingly, the cold box interior maintains, throughout the entirety of the gas purification process, the same temperature at which the indicated streams are passed through the cold box interior, after the cryogenic separation.

I claim:

1. A gas purification process, comprising the steps,
   1) supplying a first stream of feed gas containing hydrogen and nitrogen in a MOL. Ratio of about 2/1, and also containing methane and argon,
   2) cryogenically separating the feed gas into the following
      a) a second stream of synthesis gas containing hydrogen and nitrogen in a MOL. Ratio of about 3/1,
      b) a waste gas stream containing principally nitrogen, and also containing substantially all of the methane supplied in the first stream,
   3) and splitting the waste gas stream into:
      c) a third stream of nitrogen rich gas
      d) a fourth stream of methane rich gas useful as a fuel, or as a feed to a subsequent process,
   4) there being a cold box having a common cold interior, and wherein said first, second, third and fourth streams, and said waste gas stream after cooling thereof are passed through said common cold interior of said cold box, said interior effectively maintaining throughout the entirety of the gas purification process the same temperature at which said first, second, third and fourth streams are passed through the cold box interior after said cryogenically separating, said second stream of synthesis gas passed to the cold box at a temperature below about $-284°$ F.
   5) and then delivering said second stream of synthesis gas to an ammonia synthesis process.

2. The process of claim 1 including delivering said second, third and fourth streams as product streams.

3. The process of claim 2 wherein said second, third and fourth streams are passed in parallel relation through the cold box.

4. The process of claim 1 including delivering said second stream of synthesis gas to an ammonia synthesis process.

5. The process of claim 1 including providing an expander turbine in series with said third stream, to produce refrigeration.

6. The process of claim 1 including:
   i) providing a Joule Thompson valve through which the waste gas stream is passed, to drop the gas pressure and produce refrigeration, and
   ii) then passing the waste gas to a heat exchanger for cooling of said second stream,
   iii) then passing the waste gas to said cold box.

7. The process of claim 1 including recompressing the waste gas prior to said splitting step.

8. The process of claim 7 including passing the recompressed waste gas through said cold-box before said splitting.

9. The process of claim 8 wherein the waste gas is also passed through the cold box prior to said recompressing.

10. The process of claim 8 including providing a separator column to which the recompressed waste gas is passed after its passage through the cold box, and operating said separator column to produce said splitting.

11. The process of claim 10 including recycling fluid from said column to and through the cold box, to lower its temperature, and returning the recycled fluid to the column.

* * * * *